US009926178B2

(12) United States Patent
Okroy et al.

(10) Patent No.: US 9,926,178 B2
(45) Date of Patent: Mar. 27, 2018

(54) ACTUATOR IN A LIFT TRUCK

(71) Applicant: Crown Equipment Corporation, New Bremen, OH (US)

(72) Inventors: Martin Okroy, Munich (DE); Jason Kremer, New Bremen, OH (US); Lee Wente, Minster, OH (US); Kevin A. Gilliland, Coldwater, OH (US)

(73) Assignee: Crown Equipment Corporation, New Bremen, OH (US)

( * ) Notice: Subject to any disclaimer, the term of this patent is extended or adjusted under 35 U.S.C. 154(b) by 739 days.

(21) Appl. No.: 14/463,697

(22) Filed: Aug. 20, 2014

(65) Prior Publication Data

US 2016/0052759 A1    Feb. 25, 2016

(51) Int. Cl.
*F16J 15/16*        (2006.01)
*B66F 9/22*         (2006.01)
(Continued)

(52) U.S. Cl.
CPC ............ B66F 9/22 (2013.01); F15B 15/1461 (2013.01); F15B 15/227 (2013.01); F16J 15/16 (2013.01)

(58) Field of Classification Search
CPC .. F15B 15/1461; F15B 15/149; F15B 15/222; F15B 15/223
See application file for complete search history.

(56) References Cited

U.S. PATENT DOCUMENTS 1,141,447 A * 6/1915 Dellwitz ................. F15B 11/06
                                                          91/392
2,443,312 A    6/1948 Geiger et al.
(Continued)

FOREIGN PATENT DOCUMENTS

DE    2152641 A1 *  5/1972  ............ F15B 15/222
EP    1621780 A1    1/2006
(Continued)

OTHER PUBLICATIONS

Wittmann-Regis, Agnes; International Preliminary Report on Patentability; International Application No. PCT/US2015/045635; dated Feb. 21, 2017; International Bureau of WIPO; Geneva, Switzerland.
Document A; Drawing of a cylinder; the cylinder was available at least as early as Aug. 20, 2013.
Document B; Drawing of a cylinder; the cylinder was available at least as early as Aug. 20, 2013.
Document C; Drawing of a cylinder; the cylinder was available at least as early as Aug. 20, 2013.
(Continued)

*Primary Examiner* — Michael Leslie
*Assistant Examiner* — Matthew Wiblin
(74) *Attorney, Agent, or Firm* — Stevens & Showalter, LLP

(57) ABSTRACT

An actuator includes a ram structure slidably mounted within a cylinder structure bore and defines with the cylinder structure a gap therebetween. A fluid passageway structure in the ram structure defines a path for fluid to flow through the ram structure and includes an outlet in a sidewall of the ram structure. A cushioning seal located between the ram structure and the cylinder structure can engage the ram structure and a cylinder cap during ram structure extension such that the seal substantially closes off a first portion of the gap extending from the seal toward an open end of the cylinder structure. The cushioning seal can move during ram structure retraction in a direction of ram structure retraction such that fluid flowing out of the ram structure sidewall outlet, when the outlet is in the gap first portion, flows between the seal and the cylinder cap.

17 Claims, 13 Drawing Sheets

(51) Int. Cl.
*F15B 15/14* (2006.01)
*F15B 15/22* (2006.01)

(56) References Cited

U.S. PATENT DOCUMENTS

| | | | | |
|---|---|---|---|---|
| 3,232,180 | A | * | 2/1966 | Deschenes ............... B21J 15/18 91/392 |
| 3,285,616 | A | | 11/1966 | Doutt |
| 3,401,604 | A | | 9/1968 | Blatt et al. |
| 3,913,460 | A | | 10/1975 | Wright |
| 4,026,523 | A | | 5/1977 | Gratzmuller |
| 4,296,675 | A | * | 10/1981 | Gies ...................... F15B 15/222 277/580 |
| 4,301,714 | A | * | 11/1981 | Stenlund ............... F15B 15/222 91/26 |
| 4,447,047 | A | * | 5/1984 | Newell ................. F15B 15/149 267/118 |
| 4,458,717 | A | | 7/1984 | Boland |
| 4,638,717 | A | | 1/1987 | Carr |
| 4,688,775 | A | * | 8/1987 | Kadis ..................... B21D 24/02 184/18 |
| 4,706,781 | A | * | 11/1987 | Ikimi ....................... B66F 9/08 187/234 |
| 4,706,932 | A | | 11/1987 | Yoshida et al. |
| 5,595,148 | A | | 1/1997 | Letsche et al. |
| 5,960,696 | A | | 10/1999 | Niwa et al. |
| 6,017,015 | A | | 1/2000 | Heusser |
| 6,557,456 | B2 | | 5/2003 | Norton et al. |
| 7,204,184 | B2 | | 4/2007 | Zimmer |
| 8,714,311 | B2 | | 5/2014 | Billger et al. |
| 2011/0094374 | A1 | * | 4/2011 | Chung .................. F15B 15/222 91/395 |
| 2011/0247485 | A1 | | 10/2011 | Hauser |

FOREIGN PATENT DOCUMENTS

| | | | |
|---|---|---|---|
| JP | 2617954 | B2 * | 6/1997 ............ F15B 15/222 |
| JP | 2000055010 | A | 2/2000 |

OTHER PUBLICATIONS

Document D; Description of a cylinder; the cylinder was available at least as early as Aug. 20, 2013.
Document E; Photographs of a device; the device was available at least as early as 2006.
Document F; Still Parts Book, p. 449; Apr. 18, 2012.
Ross, Kenneth; International Search Report and Written Opinion of the International Searching Authority; International Application No. PCT/US2015/045635; dated Oct. 22, 2015; European Patent Office.

* cited by examiner

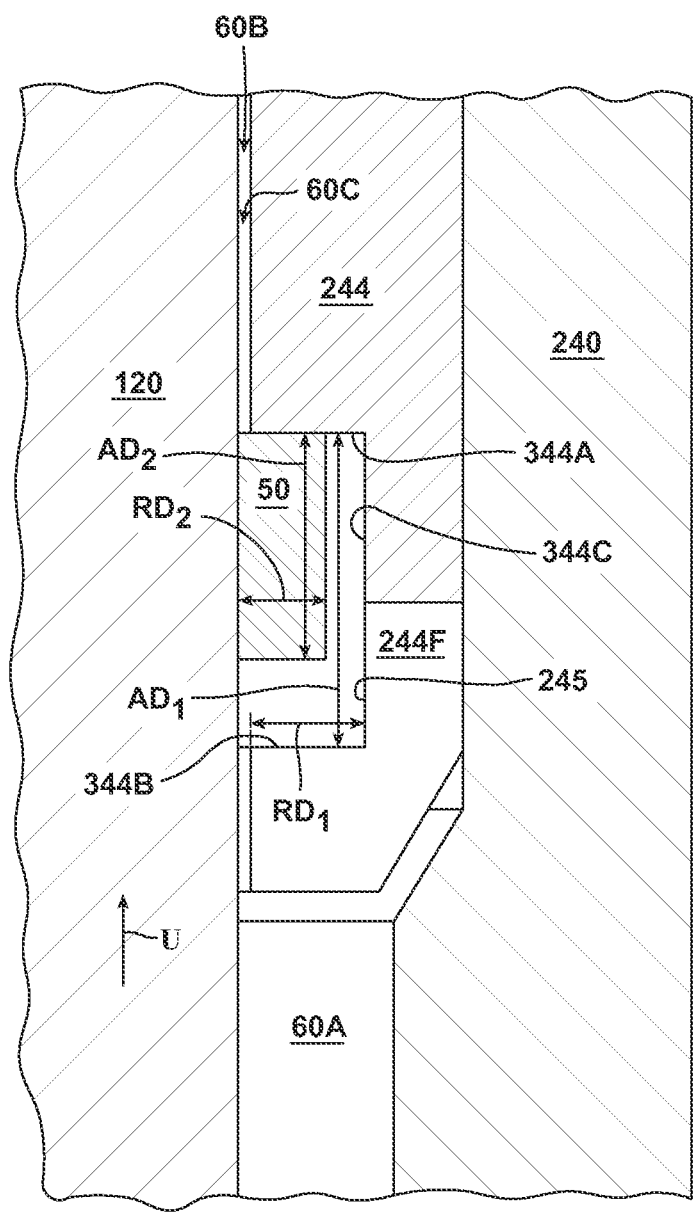

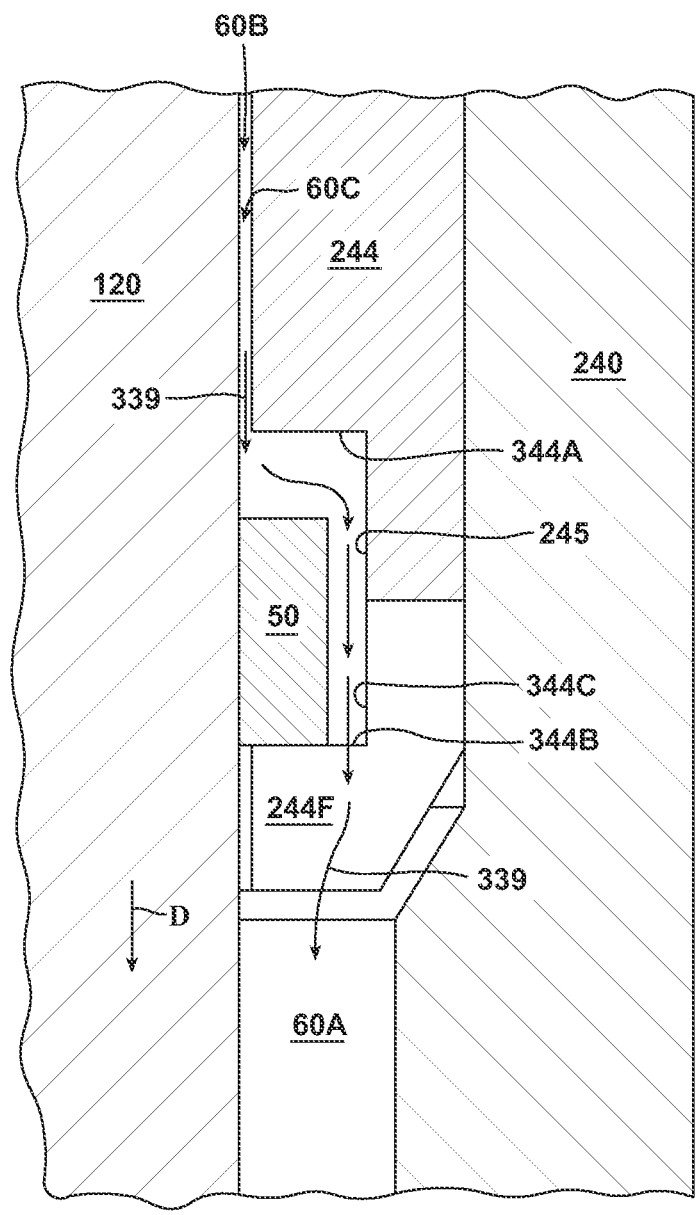

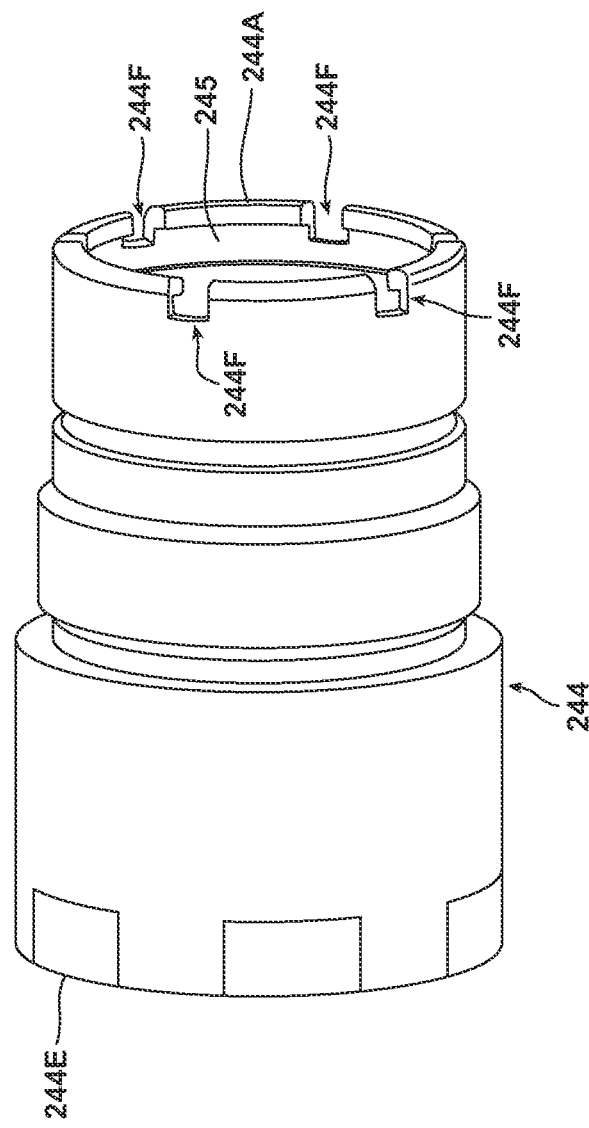

ACTUATOR IN A LIFT TRUCK

FIELD OF THE INVENTION

The present invention relates to an actuator in a lift truck and more specifically to an actuator having a cushioning seal, which functions to substantially close off a first portion of a gap between a ram structure and a cylinder structure during ram structure extension and allows fluid to flow between the seal and the cylinder structure during ram retraction.

BACKGROUND OF THE INVENTION

U.S. Pat. No. 4,706,781 discloses a load lifting cylinder having a lateral hole 119, which communicates with a bore 106 of a piston element 105, see FIGS. 4-6. A piston rod 107 is coupled to the piston element 105. The '781 patent teaches in column 8, lines 23-34: "When the piston element 105 approaches the uppermost position, and the lateral hole 119 is closed by the rod guide 116, the working fluid in the upper cylinder chamber 104B is permitted to leak out of the chamber 104B into the bottom cylinder chamber 104A only via the small hole 118. That is, the flow rate is extremely limited, due to the closure of the lateral hole 119. As a result, the piston speed is decelerated by the resistance caused by the limited flow of the working fluid. Therefore, the piston element 105 reaches the uppermost position determined by the rod guide 117 at a sufficiently reduced speed without the occurrence of shock." The '781 patent further teaches in column 9, lines 20-26: "it should be noted that if the opening ends of the lateral hole 119 are vertically extended in a longitudinal direction of the piston rod 107, it is possible to delicately control the speed of the piston movement when the piston element 105 approaches or moves away from the uppermost position thereof."

SUMMARY OF THE INVENTION

In accordance with a first aspect of the present invention, an actuator in a lift truck having an extendible mast is provided. The actuator may comprise: cylinder structure, ram structure and a cushioning seal. The cylinder structure may comprise a cylinder tube, a cylinder base and a cylinder cap. The base and cap may be coupled to the tube. The tube and cap may define a cylinder structure bore extending from the base to an outer open end of the cylinder structure. The ram structure is slidably mounted within the cylinder structure bore and defines with the cylinder structure a gap therebetween. The ram structure may comprise fluid passageway structure for defining a path for fluid to move internally through the ram structure. The path may communicate with an outlet in a sidewall of the ram structure. The cushioning seal may be located between the ram structure and the cylinder structure and engage the ram structure and the cylinder cap during ram structure extension such that the seal substantially closes off a first portion of the gap extending from the seal toward the cylinder structure outer open end. The cushioning seal may be moved during ram structure retraction in a direction of ram structure retraction such that fluid flowing out of the ram structure sidewall outlet when the outlet is in the gap first portion flows between the seal and the cap.

The cap may comprise an internal recess for receiving the cushioning seal. The recess may have an axial dimension greater than an axial dimension of the seal and a radial dimension greater than a radial dimension of the seal. The seal may be formed from metal. The seal may be movable within the recess in a direction toward or away from the cylinder structure outer open end.

The seal may comprise a main body comprising an axially extending stepped slot so as to allow the seal to expand outwardly, with the seal main body having an unexpanded inner diameter which is slightly smaller than an outer diameter of the ram structure such that the seal is expanded slightly to be fitted over the ram structure.

The cap comprises first and second ends. The second end may define the cylinder structure outer open end. The first end may comprise one or more grooves through which fluid passes into a first section of the gap generally defined by a ram element of the ram structure and the cylinder tube during ram structure retraction when the outlet is in the gap first portion.

An inner diameter of the cylinder cap may be smaller than an inner diameter of the cylinder tube such that the first section of the gap defined by the ram element and the cylinder tube is larger than a second section of the gap defined by the ram element and the cylinder cap.

The cylinder cap of a further embodiment may comprise first and second ends, the second end defining the cylinder structure outer open end, the first end comprising an angled inner surface.

The seal of the further embodiment may comprise a main body comprising an inner sidewall and an angled outer sidewall. The seal may be urged by fluid during ram structure extension such that the seal main body inner sidewall engages the ram structure and the seal main body angled outer sidewall engages the cylinder cap first end angled inner surface such that the seal substantially closes off the gap first portion.

The seal main body may further comprise at least one groove through which fluid passes into a first section of the gap defined by a ram element of the ram structure and the cylinder tube during ram structure retraction when the outlet is in the gap first portion.

An inner diameter of the cylinder cap may be smaller than an inner diameter of the cylinder tube such that the first section of the gap defined by the ram element and the cylinder tube is larger than a second section of the gap defined by the ram element and the cylinder cap.

In accordance with the further embodiment, the seal may be formed from a polymeric material.

An orifice may be provided in the ram structure sidewall so as to communicate with the outlet and extends away from the outlet in a direction towards the cylinder base. The orifice may provide a path for fluid to flow from a first section of the gap defined by a ram element of the ram structure and the cylinder tube into the outlet during ram structure extension. The outlet may be provided in the ram element.

The orifice may be shaped such that the resistance to fluid flow from the gap first section into the outlet increases as the outlet moves adjacent to and beyond the seal causing pressure to gradually increase in the gap first section resulting in the ram structure decelerating at a substantially smooth rate at the end of ram structure extension.

The orifice may comprise a tear-drop shaped orifice.

The ram structure may comprise a ram element and a piston coupled to the ram element. The ram element may have a first outer diameter and the piston may have a second outer diameter greater than the first outer diameter.

The gap may comprise a first section generally defined radially by the ram element of the ram structure and the cylinder tube and may extend axially between the piston and a first end of the cylinder cap. A second section of the gap may generally be defined radially by the ram element and the cylinder cap and extend axially from the first end of the cylinder cap to a ram element seal.

The fluid passage structure may comprise an axially extending bore provided in a ram element of the ram structure which communicates with the cylinder base and a radially extending bore in the ram element which communicates with the axially extending bore and the outlet. The outlet may be provided in a sidewall of the ram element.

Fluid may only enter the cylinder structure through the cylinder base.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

FIG. 7 illustrates the position of the cushioning seal of FIGS. 4-6 during ram structure extension;

FIG. 8 illustrates the position of the cushioning seal of FIGS. 4-6 during ram structure retraction;

FIG. 9 is a perspective view of the cylinder cap illustrated in FIG. 2;

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
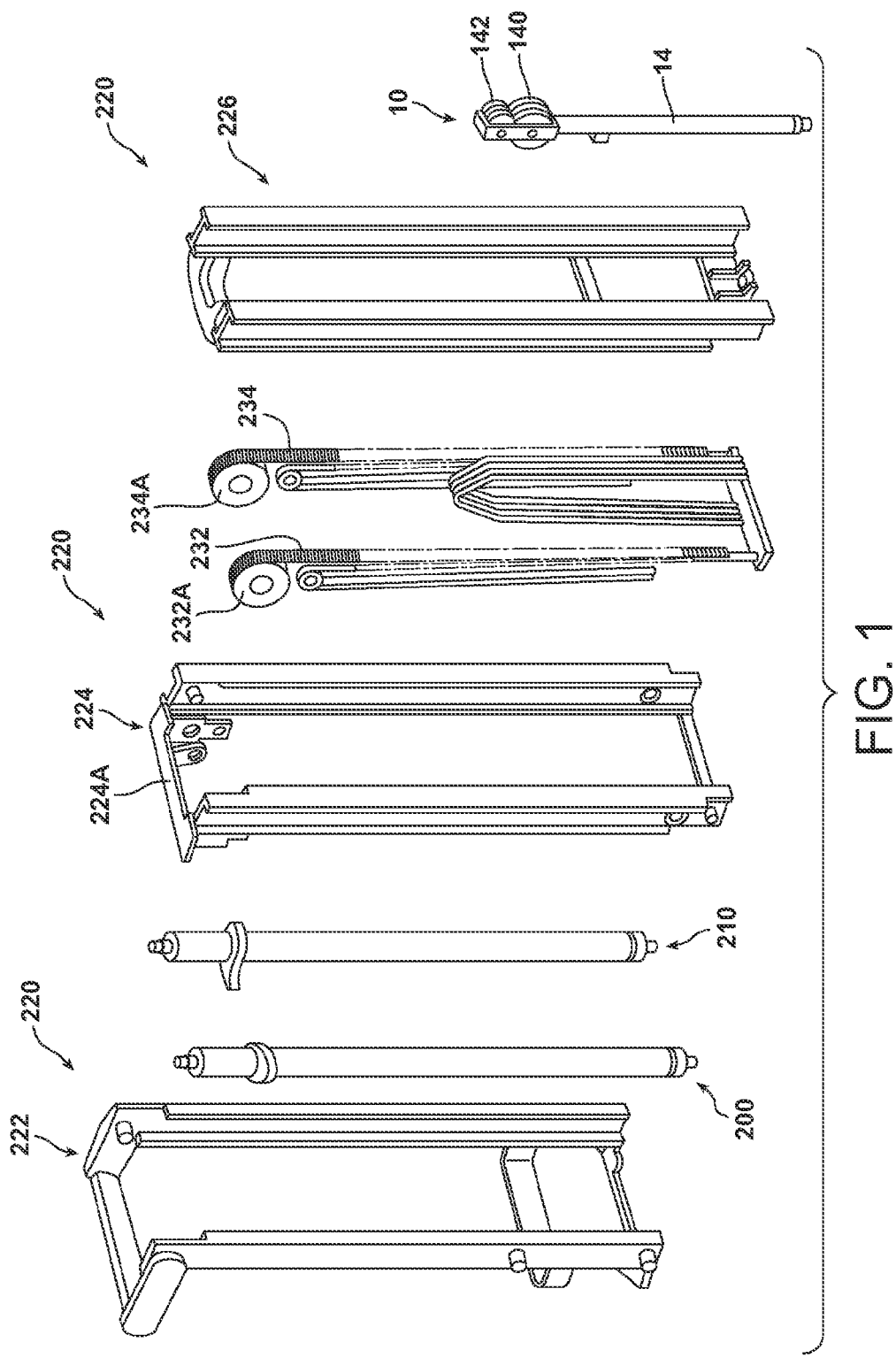
FIG. 1 is an exploded view of a mast assembly in which the primary ram and cylinder assembly of the present disclosure may be incorporated.

The present disclosure provides an improved cushioning system to reduce shock forces as a ram of a primary ram and cylinder assembly 10 reaches the end of its stroke and as the rams of first and second secondary ram and cylinder assemblies 200 and 210 begin to move upward. The primary ram and cylinder assembly 10 and the first and second secondary ram and cylinder assemblies 200 and 210 may be provided in a materials handling vehicle comprising, for example, a stand-up or sit down counter balance truck, a narrow isle reach truck or any other vehicle having a series of cylinders where a next cylinder in the series requires a slightly higher pressure to start moving than a cylinder before it. The vehicle may comprise a power unit (not shown), a mast assembly 220, a mast weldment lift structure comprising the first and second secondary ram and cylinder assemblies 200 and 210, a fork carriage apparatus (not shown) and a fork carriage apparatus lift structure comprising the primary ram and cylinder assembly 10, see FIG. 1. The mast assembly 220 comprises, in the illustrated embodiment, first, second and third mast weldments 222, 224 and 226, see FIG. 1, wherein the second weldment 224 is nested within the first weldment 222 and the third weldment 226 is nested within the second weldment 224. The first weldment 222 is fixed to the vehicle power unit. The second or intermediate weldment 224 is capable of vertical movement relative to the first weldment 222. The third or inner weldment 226 is capable of vertical movement relative to the first and second weldments 222 and 224.

It is also contemplated that the primary ram and cylinder assembly 10 of the present invention may also be incorporated into a mast assembly having a single mast weldment, two mast weldments or more than three mast weldments. It is further contemplated that the primary ram and cylinder assembly 10 of the present invention may be used in a monomast assembly such as disclosed in U.S. Pat. No. 8,714,311 B2, by Billger et al., entitled "Monomast for a Materials Handling Vehicle," the entire disclosure of which is incorporated by reference herein.

The first and second secondary ram and cylinder assemblies 200 and 210 are fixed at their cylinders to the first weldment 222. Rams extending from the cylinders of the first and second secondary ram and cylinder assemblies 200 and 210 are fixed to an upper brace 224A of the second weldment 224.

A first chain 232 is fixed to the cylinder of the first ram and cylinder assembly 200 and a second chain 234 is fixed to the cylinder of the second ram and cylinder assembly 210. The first chain 232 extends over a first pulley 232A coupled to an upper end of the second mast weldment 224 and is coupled to a lower portion of the third weldment 226. The second chain 234 extends over a second pulley 234A coupled to the upper end of the second mast weldment 224 and is also coupled to the third weldment lower portion. When the rams of the assemblies 200 and 210 are extended, the rams lift the second weldment 224 vertically relative to the fixed first weldment 222. Further, the first and second pulleys 232A and 234A fixed to the upper end of the second weldment 224 apply upward forces on the chains 232 and 234 causing the third weldment 226 to move vertically relative to the first and second weldments 222 and 224. For every one unit of vertical movement of the second weldment 224, the third weldment 226 moves vertically two units.

The fork carriage apparatus comprises a pair of forks (not shown) and a fork carriage mechanism upon which the forks are mounted. The fork carriage mechanism may be mounted for reciprocal movement directly to the third mast weldment 226. Alternatively, the fork carriage mechanism may be mounted to a reach mechanism (not shown), which is mounted to a mast carriage assembly (not shown), which is mounted for reciprocal movement to the third mast weldment 226.

Figure 2:
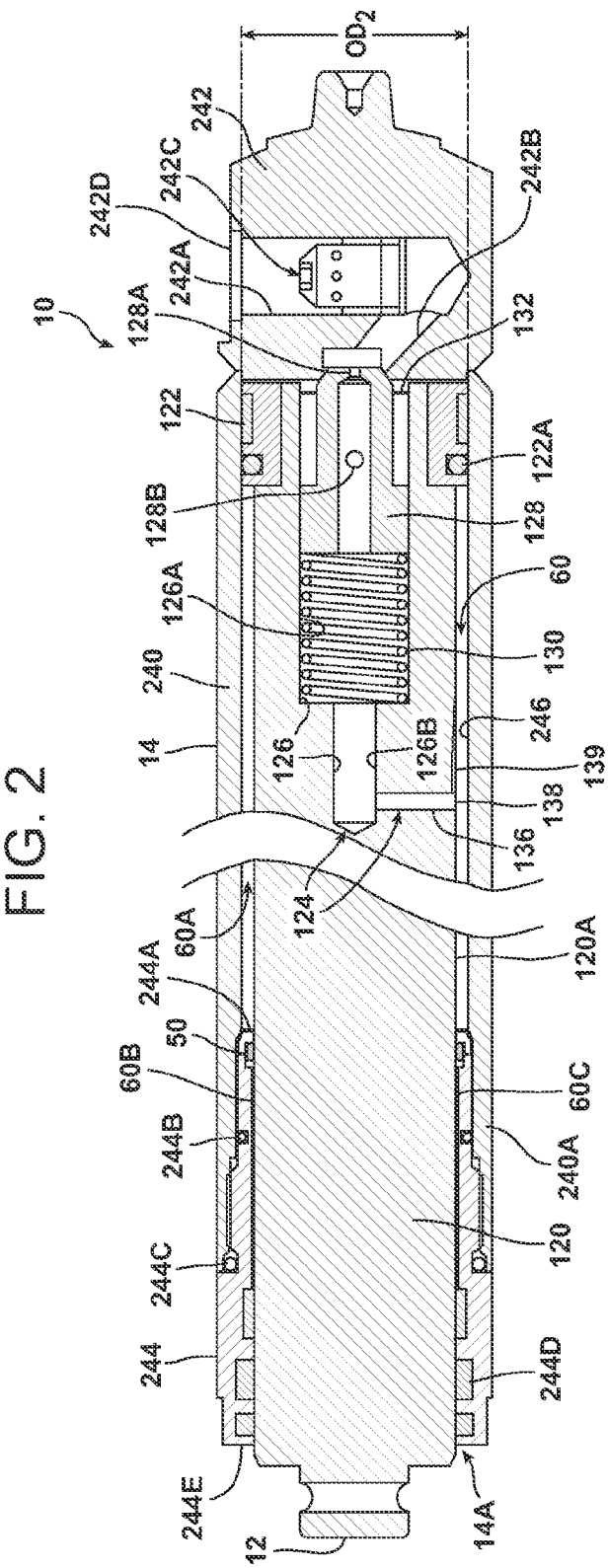
FIG. 2 is a cross sectional view of an actuator of a first embodiment of the present disclosure.

The primary ram and cylinder assembly 10, also referred to herein as an "actuator," is coupled to the third weldment 226 and the fork carriage apparatus to effect vertical movement of the fork carriage apparatus relative to the third weldment 226. The primary ram and cylinder assembly 10 comprises a ram structure 12, a cylinder structure 14 and a cushioning seal 50. The cylinder structure 14 is fixed to the third mast weldment 226 such that it moves vertically with the third weldment 226. The ram structure 12, see FIG. 2, is associated with the cylinder structure 14 and is capable of extending out from the cylinder structure 14 when pressurized hydraulic fluid is provided to the cylinder structure 14. Third and fourth pulleys 140 and 142 are coupled to an upper end of the ram structure 12, see FIG. 1. One or a pair of lift chains (not shown) are fixed at one end to the cylinder structure 14, extend over the third pulley 140 and are coupled to a lower portion (not shown) of the fork carriage apparatus. When pressurized fluid is provided to the cylinder structure 14, its ram structure 12 is extended causing the pulley 140 to move vertically relative to the third weldment 226. Vertical movement of the pulley 140 causes the lift chains to raise the fork carriage assembly relative to the third weldment 226.

The cylinder structure 14, in the illustrated embodiment, comprises a cylinder tube 240, a cylinder base 242 and a cylinder cap 244, see FIG. 2. The cylinder base 242 is coupled to the cylinder tube 240 via one or more welds or threads. The cylinder cap 244 is coupled to an outer end 240A of the cylinder tube 240 via threads. O-rings 244B and 244C are provided between the cylinder cap 244 and cylinder tube 240 to prevent fluid leakage. A ram element seal 244D is provided in an annular groove in the cylinder cap 244 and functions to prevent fluid from passing between the cylinder cap 244 and the ram structure 12 out of a cylinder structure outer open end 14A. The cap 244 and the tube 240 define a cylinder structure bore 246 extending from the base 242 to the outer open end 14A of the cylinder structure 14. The ram structure 12 is slidably mounted within the cylinder structure bore 246 and defines with the cylinder structure 14 a gap 60 therebetween.

The cylinder base 242 is provided with first and second bores 242A and 242B, wherein the first bore 242A contains a flow control valve 242C, which limits the lowering speed of the fork carriage apparatus should hydraulic fluid pressure drop substantially at an entrance 242D of the first bore 242A, see FIG. 2. Hydraulic fluid enters the cylinder structure 14 through the first bore entrance 242D in the cylinder base 242. In the illustrated embodiment, hydraulic fluid only enters the cylinder structure 14 through the cylinder base 242.

The ram structure 12 may comprise a ram element 120 and a ram piston 122 coupled to a base 120B of the ram element 120 via threads. The ram element 120 may have a first outer diameter $OD_1$ and the piston 122 may have a second outer diameter $OD_2$ greater than the first outer diameter $OD_1$, see FIGS. 2 and 3. A piston seal 122A is provided in an annular recess of the piston 122.

The ram element 120 comprises fluid passage structure 124 for defining a path for fluid to move internally through the ram structure 12. The fluid passage structure 124 comprises an axially extending bore 126 and a radially extending bore 136. The axially extending bore 126 communicates with the cylinder base second bore 242B so as to receive hydraulic fluid from the cylinder base 242, see FIG. 2. The axially extending bore 126 comprises first and second sections 126A and 126B, wherein the first section 126A has a larger diameter than the second section 126B. A shutoff piston 128, a compression spring 130 and a retaining ring 132 are provided in the axially extending bore first section 126A. The piston 128 and spring 130 function to reduce fluid flow out of the cylinder tube 240 during descent of the ram structure 12 to reduce the velocity of the downwardly moving ram structure 12 once the piston 128 engages the cylinder base 242. When the piston 128 engages the cylinder base 242, fluid flow exits the cylinder tube 240 via a second bore 128B then a first bore 128A in the piston 128, see FIG. 2.

As noted above, the ram structure 12 defines with the cylinder structure 14 the gap 60 therebetween. The gap 60, in the illustrated embodiment, comprises a first section 60A generally defined radially by a sidewall 120A of the ram element 120 of the ram structure 12 and an inner surface of the cylinder tube 240 and extends axially between the ram piston 122 and a first end 244A of the cylinder cap 244. The length of the gap first section 60A is variable based on the position of the ram piston 122 relative to the cylinder cap first end 244A. A second section 60B of the gap 60 is defined radially by the sidewall 120A of the ram element 120 and an inner surface of the cylinder cap 244 and extends axially from the first end 244A of the cylinder cap 244 to the ram element seal 244D. In the illustrated embodiment, an inner diameter of the cylinder cap 244 is smaller than an inner diameter of the cylinder tube 240 such that the first section 60A of the gap 60 is radially larger than a second section 60B of the gap 60.

Figure 3:
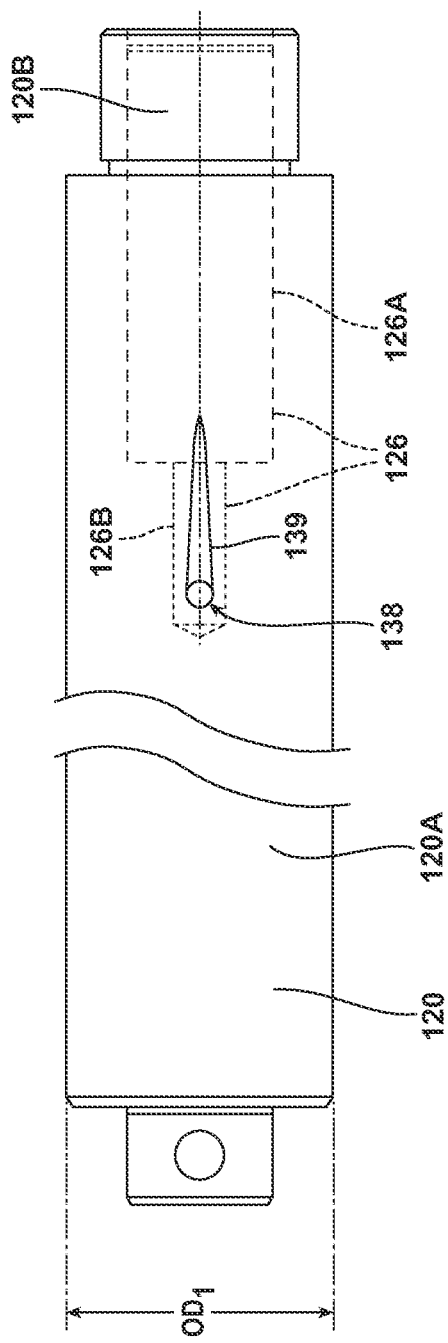
FIG. 3 is a view of a ram element of a ram structure of the actuator of FIG. 2.

The radially extending bore 136 in the ram element 120 communicates with the axially extending bore 126 and an outlet 138 in the sidewall 120A of the ram element 120, see FIGS. 2 and 3. An orifice or recess 139 is provided in the ram structure sidewall 120A and communicates with the outlet 138. The orifice 139 extends away from the outlet 138 in a direction towards the cylinder base 242. In the illustrated embodiment, the orifice 139 provides a path for fluid to flow from the first section 60A of the gap 60 to the outlet 138 and radially extending bore 136. More specifically, the orifice 139 is shaped and sized such that the resistance to fluid flow from the gap first section 60A into the outlet 138 increases as the outlet 138 moves adjacent to and beyond the cylinder cap first end 244A and the cushioning seal 50 during ram structure extension causing pressure to gradually increase in the gap first section 60A resulting in the ram structure 12 decelerating at a substantially smooth rate at the end of ram structure extension. The increase in pressure in the gap first section 60A causes an increase in force being applied by the fluid against the ram piston 122 in a direction opposing ram structure extension. In the illustrated embodiment, the orifice 139 is tear-drop shaped. However, the orifice 139 may have any another configuration, e.g., comprise multiple orifices, multiple slots of varying lengths or a single orifice of any geometric shape, such that the resistance to fluid flow from the gap first section 60A into the outlet 138 increases as the outlet 138 moves adjacent to and beyond the cylinder cap first end 244A and the cushioning seal 50.

A hydraulic fluid supply source (not shown) provides fluid to the cylinder base 242 to increase the pressure of the fluid supplied to the base 242 in response to the increase in resistance to upward movement of the ram structure 12. Since the first and second secondary ram and cylinder assemblies 200 and 210 are connected to the same fluid supply source as the primary ram and cylinder assembly 10, the rams of the secondary assemblies also experience the increase in pressure and, hence, the rams of the first and second secondary ram and cylinder assemblies 200 and 210 begin to move vertically at a gradually increasing rate as the ram structure 12 decelerates.

Figure 5:
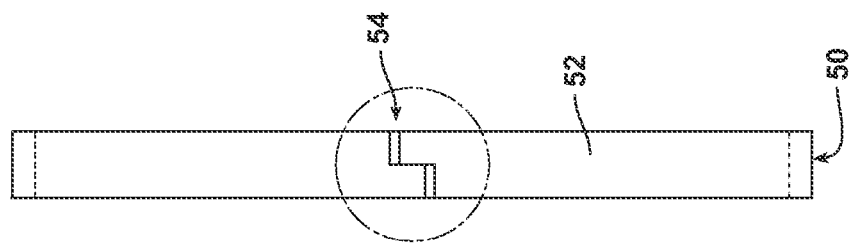
FIGS. 4 and 5 are front and side views of a cushioning seal shown in FIG. 2.
Figure 4:
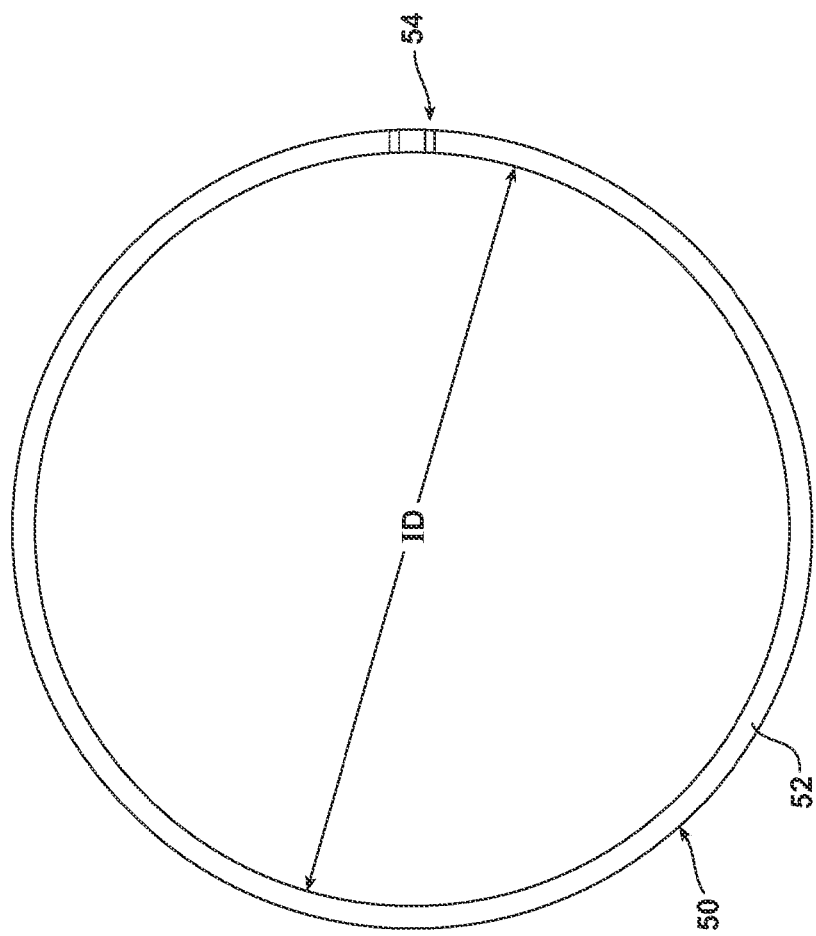
Figure 6:
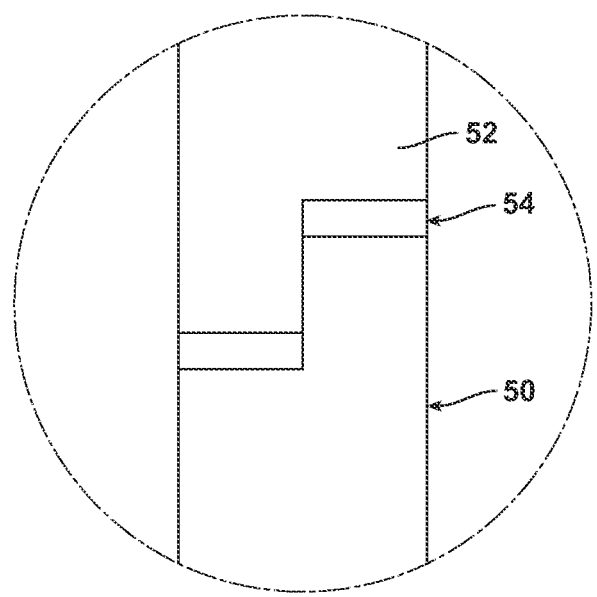
FIG. 6 is an enlarged view of a stepped slot in the cushioning seal of FIGS. 4 and 5.

In accordance with a first embodiment of the present invention, the cushioning seal 50 comprise a main body 52 having an axially and radially extending stepped slot 54 defining a separation in the main body 52 so as to allow the seal to expand outwardly, see FIGS. 4-6. The seal main body 52 has an unexpanded inner diameter ID which is slightly smaller than an outer diameter $OD_1$ of the ram element 120 such that the seal 50 is expanded slightly to be fitted over the ram element 120, see FIGS. 3 and 4. The seal 50 may be made from a metal, such as cast grey iron.

The cap 244 may comprise an internal recess 245 for receiving the cushioning seal 50, see FIGS. 7-9 (the seal 50 is not shown in FIG. 9). The recess 245 may have an axial dimension $AD_1$ greater than an axial dimension $AD_2$ of the seal 50 and a radial dimension $RD_1$ greater than a radial dimension $RD_2$ of the seal 50, see FIG. 7. The seal 50 is movable within the recess 245 in a direction toward or away from the cylinder structure outer open end 14A.

As noted above, the cap 244 comprises a first end 244A. The cap 244 also comprises a second end 244E, which defines the cylinder structure outer open end 14A. The cap first end 244A comprise a plurality of grooves 244F through which hydraulic fluid passes into the gap first section 60A during ram structure retraction when the outlet 138 is in a gap first portion 60C. The gap first portion 60C extends from the cushioning seal 50 toward the cylinder structure outer open end 14A. More specifically, the gap first portion 60C extends from the seal 50 to the ram element seal 244D.

Figure 10:
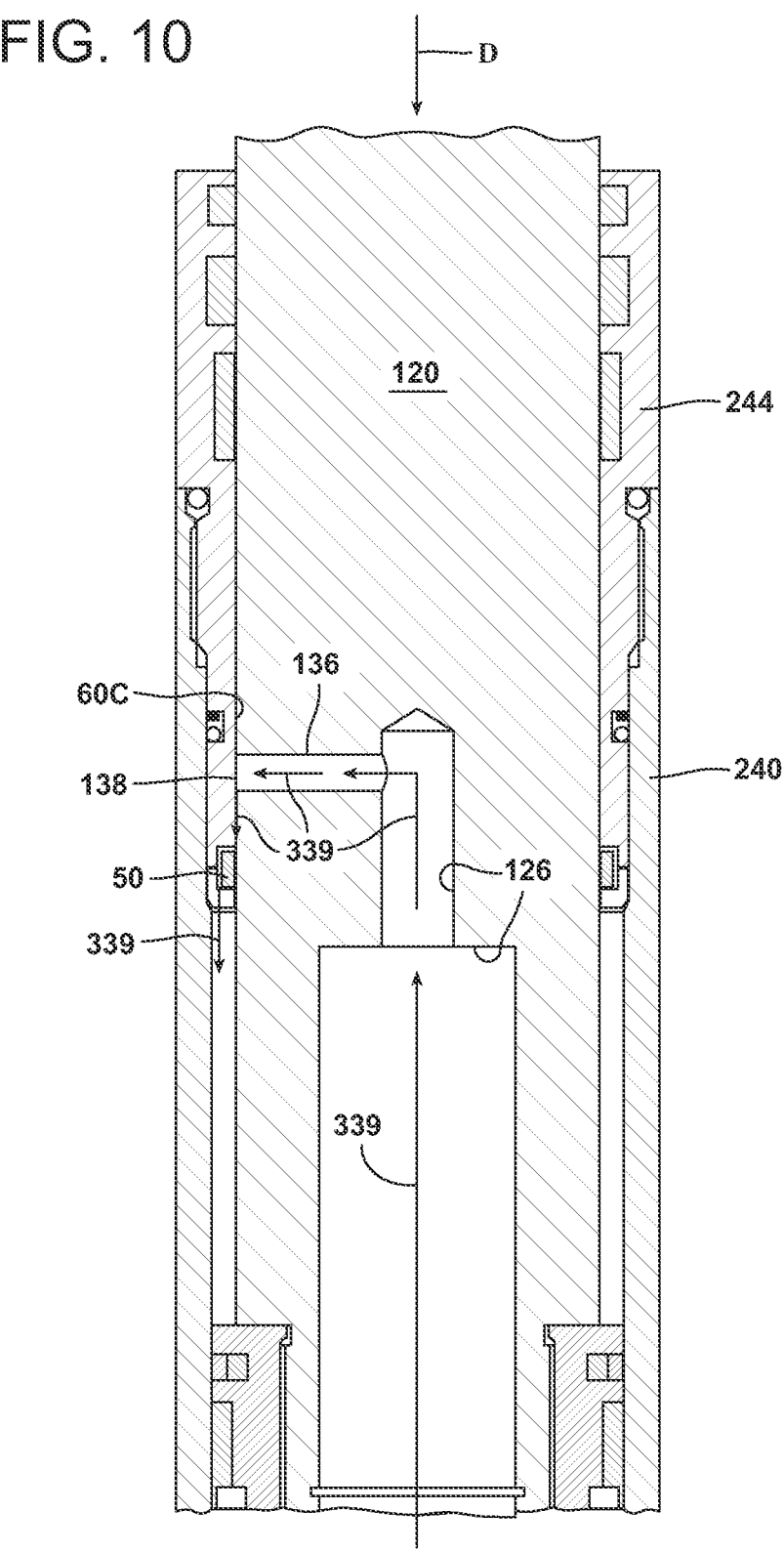
FIG. 10 illustrates fluid flow around the cushioning seal of FIGS. 4-6 when the outlet is above the seal during ram structure retraction.
Figure 12:
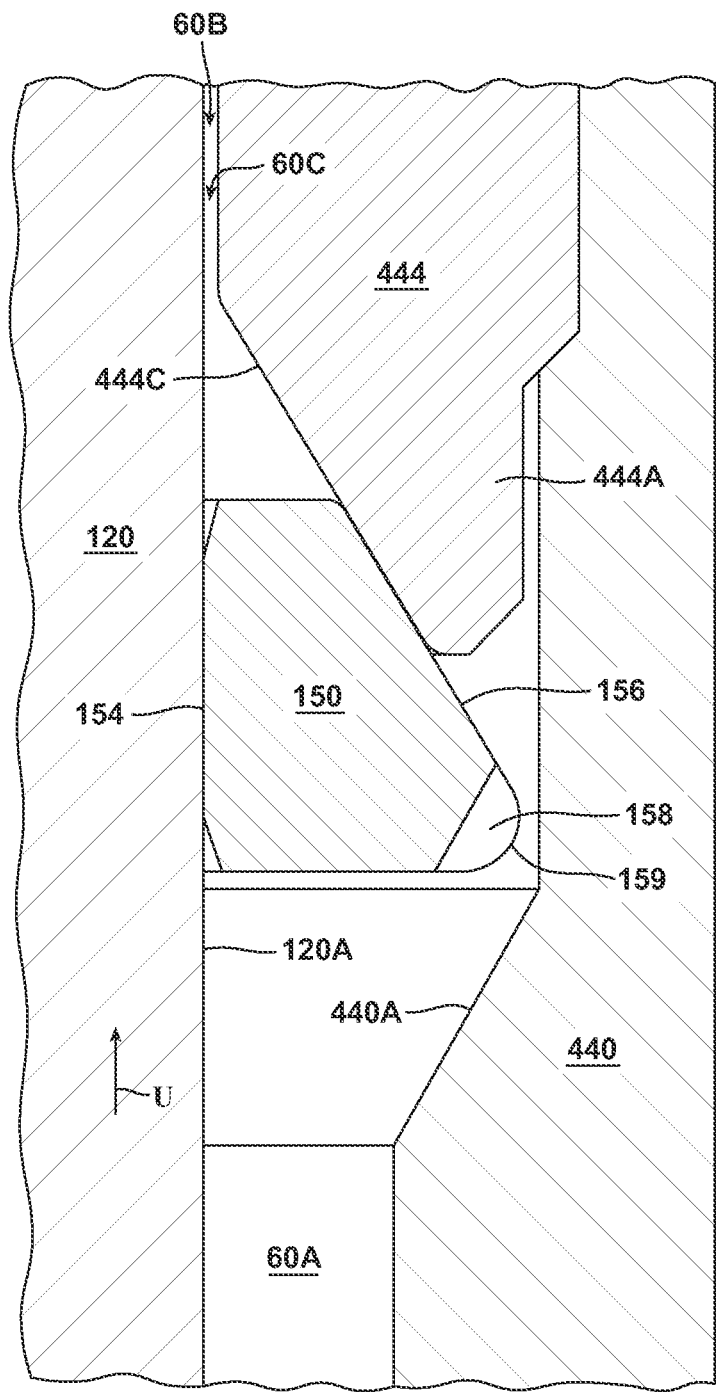
FIG. 12 illustrates the position of the cushioning seal of the second embodiment during ram structure extension.
Figure 13:
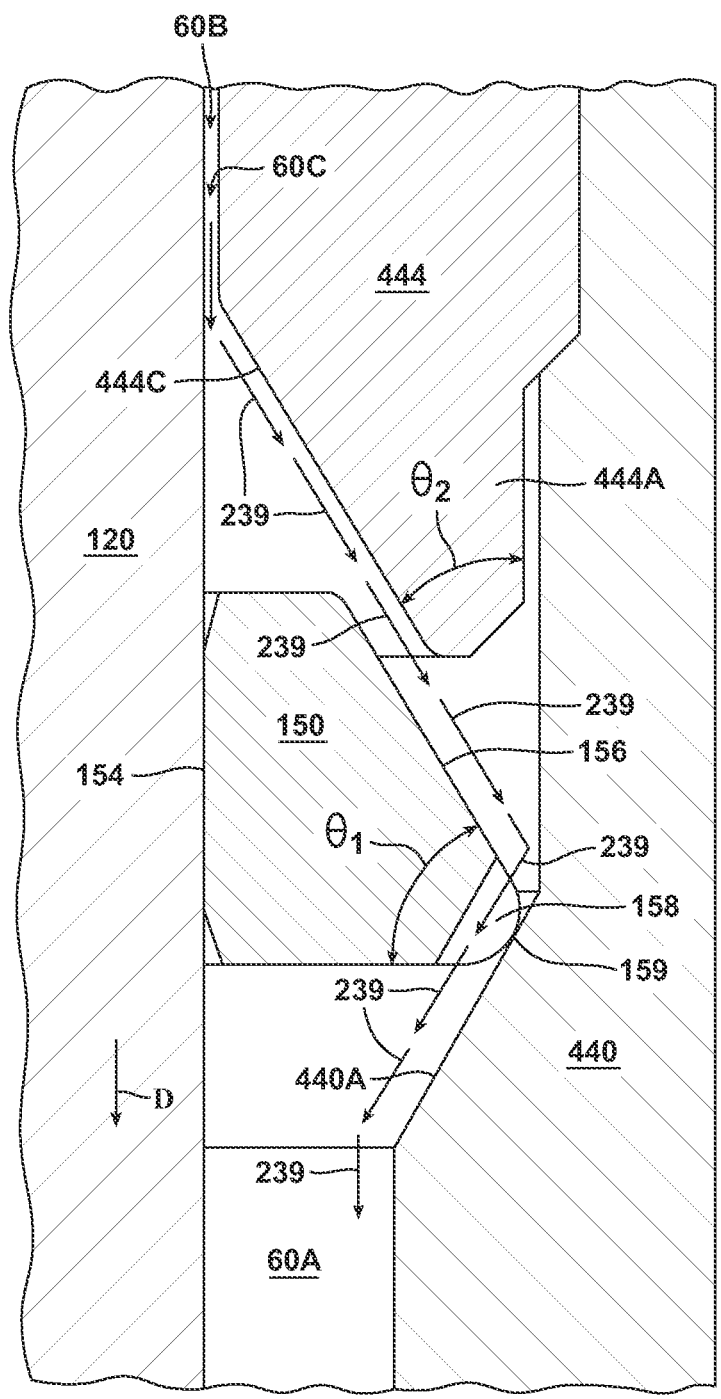
FIG. 13 illustrates the position of the cushioning seal of the second embodiment during ram structure retraction.
Figure 14:
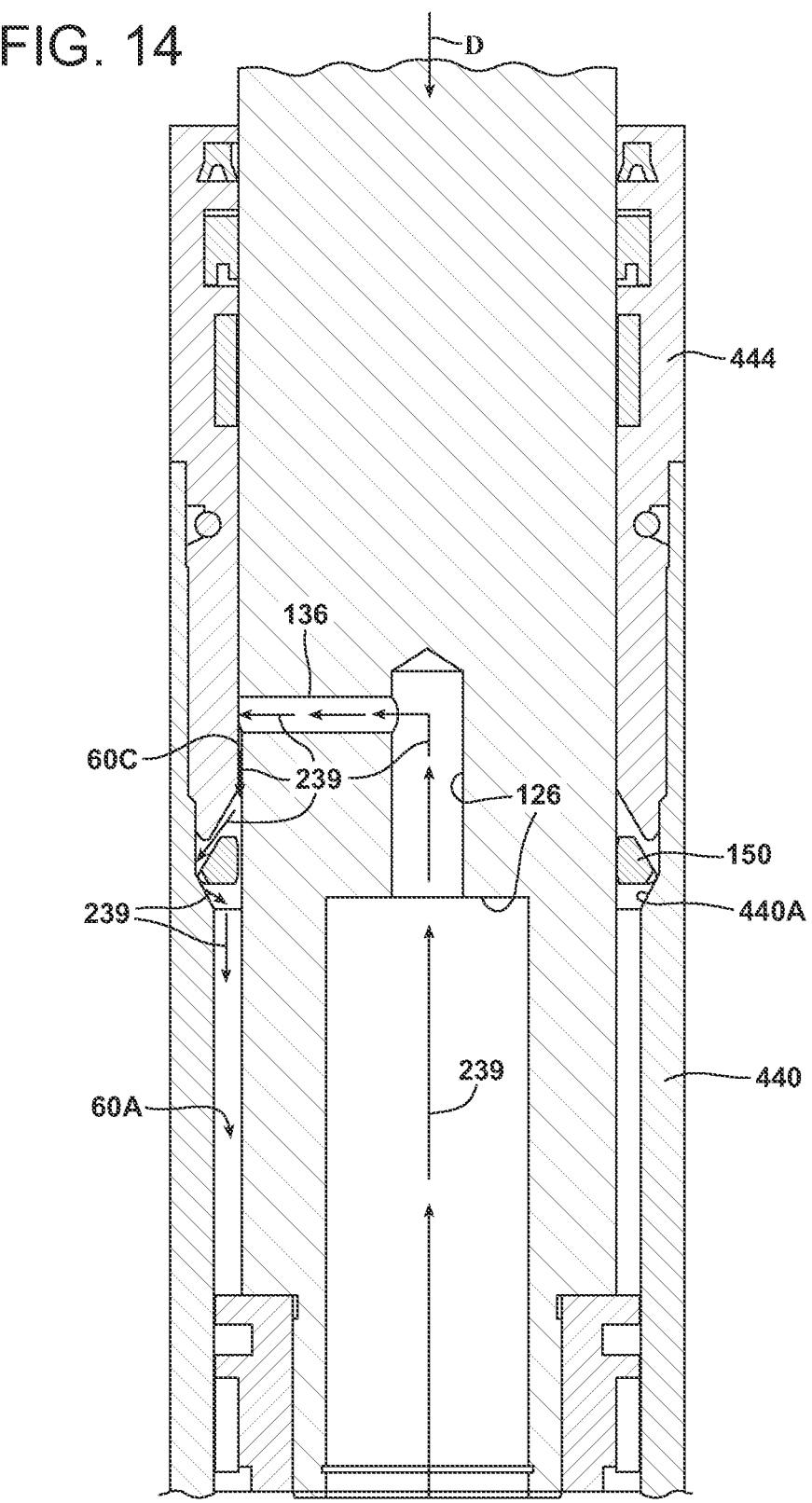
FIG. 14 illustrates fluid flow around the cushioning seal of the second embodiment when the outlet is above the seal during ram structure retraction.
Figure 15:
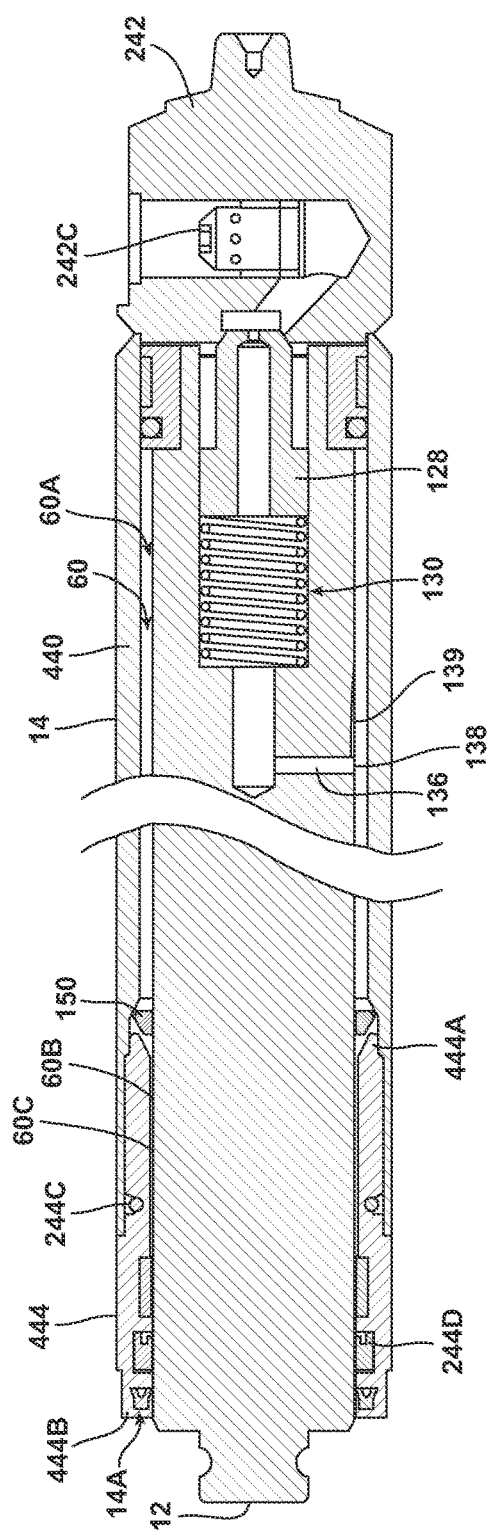
FIG. 15 is a cross sectional view of an actuator of the second embodiment of the present disclosure.

The seal 50 is located between the ram element 120 and the cap 244, see FIGS. 7, 8 and 10. Because the seal main body 52 must be slightly expanded to be positioned over the ram element 120, during ram structure extension and retraction, the seal 50 may move with the ram element 120 until it engages either an upper surface 344A or a lower surface 344B within the cap 244 and defining the cap recess 245 with a side surface 344C. During ram structure extension, the seal 50 moves upward in the same direction of movement as the ram structure 12, see arrow U in FIG. 7, until the seal 50 engages the upper surface 344A of the cap recess 245 and a portion of the ram element outer surface 120A, see FIG. 7, so as to substantially seal or close off fluid flow into the gap first portion 60C. During ram structure retraction, the seal 50 moves downward in the same direction of movement as the ram element 120, see arrow D in FIGS. 8 and 10, until it engages the lower surface 344B of the cap recess 245, see FIG. 8. Further during ram structure retraction, when the outlet 138 is located above the cushioning seal 50 and the seal 50 is away from the upper surface 344A, hydraulic fluid flows upward, due to the gap 60 increasing in size, from the cylinder base 242, through the axially extending bore 126 and the radially extending bore 136, out through the outlet 138 and into the gap first portion 60C, see arrows 339 in FIGS. 8 and 10. The fluid then flows downward towards and then around the cushioning seal 50, i.e., between the seal 50 and the cap 244, through the notches 244F provided in the cylinder cap 244 and into the gap first section 60A, see arrows 339 in FIGS. 8 and 10. It is believed that because fluid flows from the gap first portion 60C into the gap first section 60A when the outlet 138 is located above the cushioning seal 50 during ram structure retraction, the pressure within the gap first section 60A will not fall below 0 gauge pressure. Lowering of the ram structure 12 is enhanced since a pressure of less than 0 gauge pressure is unlikely to occur within the gap first section 60A during ram structure retraction with the outlet 138 located above the cushioning seal 50; hence, a very low pressure, e.g., 0 gauge or less, is not applying a significant force to the ram structure 12 in a direction opposite to its downward direction of movement.

Figure 11:
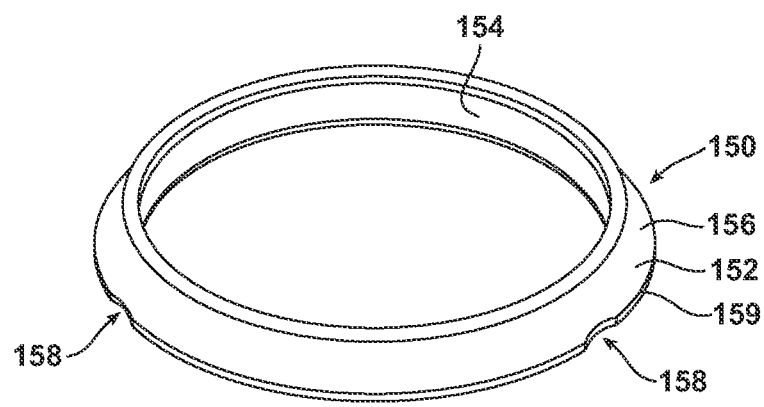
FIG. 11 is a perspective view of a cushioning seal of a second embodiment of the present disclosure.

In accordance with a second embodiment of the present invention, where elements substantially the same as those in the embodiment of FIGS. 3-10 are referenced by the same reference numerals, the cushioning seal 150 comprises a main body 152 including an inner sidewall 154 and an angled outer sidewall 156, see FIG. 11. The angled outer sidewall 156 defines an angle $\Theta_1$ relative to horizontal falling within a range of from about 50 degrees to about 70 degrees and preferably about 60 degrees. The seal main body 152 may further comprise at least one groove or notch 158, three grooves 158 are provided in the illustrated embodiment, through which fluid passes into the gap first section 60A during ram structure retraction when the outlet 138 is in the gap first portion 60C. The seal 150 may be formed from a polymeric material, such as polytetrafluoroethylene (PTFE) or nylon or a combination of these materials.

The cylinder cap 444 comprises first and second ends 444A and 444B. The second end 444B defines the cylinder structure outer open end 14A. The first end 444A comprises an angled inner surface 444C defining an angle $\Theta_2$ relative to vertical falling within a range of from about 20 degrees to about 40 degrees and preferably about 30 degrees. It is noted that an O-ring 244C is provided between the cylinder cap 444 and cylinder tube 440 to prevent fluid leakage.

The seal 150 is located between the ram element 120 and the cap 444 and cylinder tube 440, see FIGS. 12-15. An inner diameter of the seal 150 may be slightly larger than the outer diameter $OD_1$ of the ram element 120. During ram structure extension, the seal 150 is caused to move upward by fluid flowing through the gap first section 60A in the same direction of movement as the ram structure 12, see arrow U in FIG. 12, until the seal 150 engages the angled inner surface 444C of the cylinder cap 444 and a portion of the ram element outer surface 120A, see FIG. 12, so as to substantially seal or close off fluid flow into the gap first portion 60C. During ram structure retraction, fluid flowing downward through the gap first portion 60C causes the seal 150 to move downward in the same direction of movement as the ram element 120, see arrow D in FIG. 13, until an outer peripheral edge 159 of the seal 150 engages an angled surface 440A of the cylinder tube 440, see FIG. 13. Further during ram structure retraction, when the outlet 138 is located above the cushioning seal 150 and the seal 150 is away from the cylinder cap angled surface 444C, hydraulic fluid flows, due to the gap 60 increasing in size, upward from the cylinder base 242, through the axially extending bore 126 and the radially extending bore 136, out through the outlet 138 and into the gap first portion 60C, see arrows 239 in FIGS. 13 and 14. The fluid then flows downward towards and then around the cushioning seal 150, i.e., between the seal 150 and the cap 444, through the grooves or notches 158 provided in the seal 150 and into the gap first section 60A, see arrows 239 in FIGS. 13 and 14. It is believed that because fluid flows from the gap first portion 60C into the gap first section 60A when the outlet 138 is located above the cushioning seal 150 during ram structure retraction, the pressure within the gap first section 60A will not fall below 0 gauge pressure. Lowering of the ram structure 12 is enhance since a pressure of less than 0 gauge pressure is unlikely to occur within the gap first section 60A during ram structure retraction with the outlet 138 located above the cushioning seal 150; hence, a very low pressure, e.g., 0 gauge or less, is not applying a significant force to the ram structure 12 in a direction opposite to its downward direction of movement.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An actuator in a lift truck having an extendible mast, said actuator comprising:
    a cylinder structure comprising a cylinder tube, a cylinder base and a cylinder cap, said cylinder base and cylinder cap being coupled to said cylinder tube, and said cylinder tube and cylinder cap defining a cylinder structure bore extending from said cylinder base to an outer open end of said cylinder structure;
    a ram structure slidably mounted within said cylinder structure bore and defining with said cylinder structure a gap therebetween, said ram structure comprising a fluid passageway structure for defining a path for fluid to move internally through said ram structure, said path communicating with an outlet in a sidewall of said ram structure; and
    a cushioning seal located between said ram structure and said cylinder structure and engaging said ram structure and said cylinder cap during an extension of the ram structure such that said cushioning seal substantially closes off a first portion of said gap extending from said cushioning seal toward said cylinder structure outer open end, said cushioning seal being moved during a retraction of the ram structure in a direction of retraction of the ram structure such that fluid flowing out of said ram structure sidewall outlet when said outlet is in said gap first portion flows between said cushioning seal and said cylinder cap;
    wherein said fluid passageway structure comprises an axially extending bore provided in a ram element of said ram structure which communicates with said cylinder base and a radially extending bore in said ram element which communicates with said axially extending bore and said outlet, said outlet being provided in a sidewall of said ram element.

2. The actuator of claim 1, wherein said cylinder cap comprises an internal recess for receiving said cushioning seal, said internal recess having an axial dimension greater than an axial dimension of said cushioning seal and a radial dimension greater than a radial dimension of said cushioning seal, said cushioning seal being movable within said internal recess in a direction toward or away from said cylinder structure outer open end.

3. The actuator of claim 2, wherein said cushioning seal comprises a main body comprising an axially extending stepped slot so as to allow said cushioning seal to expand outwardly, said cushioning seal main body having an unexpanded inner diameter which is slightly smaller than an outer diameter of said ram structure such that said cushioning seal is expanded slightly to be fitted over said ram structure.

4. The actuator of claim 3, wherein said cylinder cap comprises first and second ends, said second end defining said cylinder structure outer open end, said first end comprising one or more grooves through which fluid passes into a first section of the gap generally defined by a ram element of said ram structure and said cylinder tube during the retraction of the ram structure when said outlet is in said gap first portion.

5. The actuator of claim 4, wherein an inner diameter of said cylinder cap is smaller than an inner diameter of said cylinder tube such that the first section of the gap defined by said ram element and said cylinder tube is larger than a second section of the gap defined by said ram element and said cylinder cap.

6. The actuator of claim 3, wherein said cushioning seal is formed from a metal.

7. The actuator of claim 1, wherein said cylinder cap comprises first and second ends, said second end defining said cylinder structure outer open end, said first end comprising an angled inner surface.

8. The actuator of claim 7, wherein said cylinder seal comprises a main body comprising an inner sidewall and an angled outer sidewall, said cushioning seal being urged by fluid during the extension of the ram structure such that said cushioning seal main body inner sidewall engages said ram structure and said cushioning seal main body angled outer sidewall engages said cylinder cap first end angled inner surface such that said cushioning seal substantially closes off said gap first portion.

9. The actuator of claim 8, wherein said cushioning seal main body further comprises at least one groove through which fluid passes into a first section of the gap defined by a ram element of said ram structure and said cylinder tube during the retraction of the ram structure when said outlet is in said gap first portion.

10. The actuator of claim 9, wherein an inner diameter of said cylinder cap is smaller than an inner diameter of said cylinder tube such that said first section of the gap defined by said ram element and said cylinder tube is larger than a second section of the gap defined by said ram element and said cylinder cap.

11. The actuator of claim 8, wherein said cushioning seal is formed from a polymeric material.

12. The actuator of claim 1, wherein an orifice is provided in said ram structure sidewall, the orifice communicates with said outlet and extends away from said outlet in a direction towards said cylinder base, said orifice provides a path for fluid to flow from a first section of the gap defined by a ram element of said ram structure and said cylinder tube into said outlet during the extension of the ram structure, said outlet being provided in said ram element.

13. The actuator of claim 12, wherein said orifice is shaped such that the resistance to fluid flow from said gap first section into said outlet increases as said outlet moves adjacent to and beyond said seal causing pressure to gradually increase in said gap first section resulting in said ram structure decelerating at a substantially smooth rate at the end of the extension of the ram structure.

14. The actuator of claim 13, wherein said orifice is a tear-drop shaped orifice.

15. The actuator of claim 1, wherein said ram structure comprises a ram element and a piston coupled to said ram element, said ram element having a first outer diameter and said piston having a second outer diameter greater than said first outer diameter.

16. The actuator of claim 15, wherein said gap comprises a first section generally defined radially by said ram element of said ram structure and said cylinder tube and extending axially between said piston and a first end of said cylinder cap and a second section of the gap generally defined radially by said ram element and said cylinder cap and extending axially from said first end of said cylinder cap to a ram element seal.

17. The actuator of claim 1, wherein fluid only enters said cylinder structure through said cylinder base.

\* \* \* \* \*